(12) United States Patent
Parikh

(10) Patent No.: US 10,069,752 B2
(45) Date of Patent: *Sep. 4, 2018

(54) REMOTE SERVICE FOR EXECUTING RESOURCE ALLOCATION ANALYSES FOR DISTRIBUTED COMPUTER SYSTEMS

(71) Applicant: VMware, Inc., Palo Alto, CA (US)

(72) Inventor: Aashish Parikh, Cupertino, CA (US)

(73) Assignee: VMware Inc., Palo Alto, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/056,027

(22) Filed: Feb. 29, 2016

(65) Prior Publication Data
US 2016/0182395 A1 Jun. 23, 2016

Related U.S. Application Data

(63) Continuation of application No. 13/594,814, filed on Aug. 25, 2012, now Pat. No. 9,274,834.

(51) Int. Cl.
*G06F 15/173* (2006.01)
*H04L 12/911* (2013.01)
*G06F 9/50* (2006.01)
*G06F 11/30* (2006.01)
*G06F 11/34* (2006.01)

(52) U.S. Cl.
CPC ............... *H04L 47/70* (2013.01); *G06F 9/50* (2013.01); *G06F 11/30* (2013.01); *G06F 11/3006* (2013.01); *G06F 11/3051* (2013.01); *G06F 11/3065* (2013.01); *G06F 11/3433* (2013.01); *G06F 11/3096* (2013.01); *G06F 2201/815* (2013.01)

(58) Field of Classification Search
USPC ......... 709/226, 223; 711/162; 707/639, 999, 707/202
See application file for complete search history.

(56) References Cited

U.S. PATENT DOCUMENTS

| | | | | |
|---|---|---|---|---|
| 6,434,681 | B1 * | 8/2002 | Armangau | G06F 11/1466 |
| | | | | 711/162 |
| 7,043,738 | B2 * | 5/2006 | Mandal | G06F 17/30067 |
| | | | | 707/999.202 |
| 7,155,501 | B2 * | 12/2006 | Mandal | G06F 9/465 |
| | | | | 709/223 |
| 8,909,602 | B2 * | 12/2014 | Soundararajan | G06F 9/5077 |
| | | | | 707/639 |

* cited by examiner

*Primary Examiner* — Tammy Nguyen
(74) *Attorney, Agent, or Firm* — Thomas | Horstemeyer, LLP

(57) ABSTRACT

A system and method for performing remote resource allocation analyses on distributed computer systems utilizes a snapshot of a target distributed computer system obtained at a distributed computer system, which is transmitted to a remote resource allocation module so that a remote resource allocation analysis can be performed on the snapshot of the target distributed computer system. The snapshot includes configurations and resource usage information of at least some components of the target distributed computer system.

20 Claims, 7 Drawing Sheets

REMOTE SERVICE FOR EXECUTING RESOURCE ALLOCATION ANALYSES FOR DISTRIBUTED COMPUTER SYSTEMS

CROSS REFERENCE TO RELATED APPLICATION

This application is a continuation of Application No. 13/594,814, filed on Aug. 25, 2012, and entitled "Remote Service for Executing Resource Allocation Analyses for Distributed Computer Systems", now issued as U. S. Pat. No. 9,274,834, which is incorporated herein by reference in its entirety.

BACKGROUND

Resource allocation techniques for distributed computer systems with resource-consuming clients, such as virtual machines (VMs), are important to ensure that the clients are operating at desired or target levels. For example, if a VM dedicated to sales is running on a host computer where CPU and memory are overextended to other VMs, that VM may not be able to process orders at an acceptable level. In such a situation, additional resources of the host computer should be allocated to the sales VM or the sales VM should be moved to another host computer that has sufficient resources so that the sales VM can run efficiently at or above the acceptable level.

Conventional resource allocation techniques execute a resource allocation analysis for a single distributed computer system using at least the current utilizations of various resources of the distributed computer system and the current requirements of the various components of the distributed computer system to make changes with respect to resource allocation in the distributed computer system. However, the resource allocation analysis can be computationally intensive as the number of components in a distributed computer system increases. Thus, the number of components that can be added to a distributed computer system is limited by the processing power of the device running the resource allocation analysis. In addition, if an update or patch for the resource allocation analysis algorithm becomes available, the resource allocation analysis algorithms running at different distributed computer systems would need to be updated or patched.

SUMMARY

A system and method for performing remote resource allocation analyses on distributed computer systems utilizes a snapshot of a target distributed computer system obtained at a distributed computer system, which is transmitted to a remote resource allocation module so that a remote resource allocation analysis can be performed on the snapshot of the target distributed computer system. The snapshot includes configurations and resource usage information of at least some components of the target distributed computer system.

A method for performing remote resource allocation analyses on distributed computer systems in accordance with an embodiment of the invention comprises obtaining a snapshot of a target distributed computer system at a distributed computer system, the snapshot including configurations and resource usage information of at least some components of the target distributed computer system, interfacing with a remote resource allocation module from the distributed computer system, including requesting access to the remote resource allocation module using authorization information, the remote resource allocation module being located outside of the distributed computer system, transmitting the snapshot of the target distributed computer system to the remote resource allocation module so that a remote resource allocation analysis can be performed on the snapshot of the target distributed computer system, and receiving from the remote resource allocation module results of the resource allocation analysis on the snapshot of the target distributed computer system at the distributed computer system. In some embodiments, the steps of this method are performed when program instructions contained in a computer-readable storage medium is executed by one or more processors of a computer system.

A computer system of a distributed computer system in accordance with an embodiment of the invention comprises a processor and a local resource allocation module operably connected to the processor. The resource allocation module is configured to obtain a snapshot of a target distributed computer system. The snapshot includes configurations and resource usage information of at least some components of the target distributed computer system. The local resource allocation module includes a remote processing interface unit configured to interface with a remote resource allocation module. The remote processing interface unit is configured to request access to the remote resource allocation module using authorization information. The remote resource allocation module is located outside of the distributed computer system. The remote processing interface unit is further configured to transmit the snapshot of the target distributed computer system to the remote resource allocation module so that a remote resource allocation analysis can be performed on the snapshot of the target distributed computer system. The remote processing interface unit is further configured to receive from the remote resource allocation module results of the resource allocation analysis on the snapshot of the target distributed computer system.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
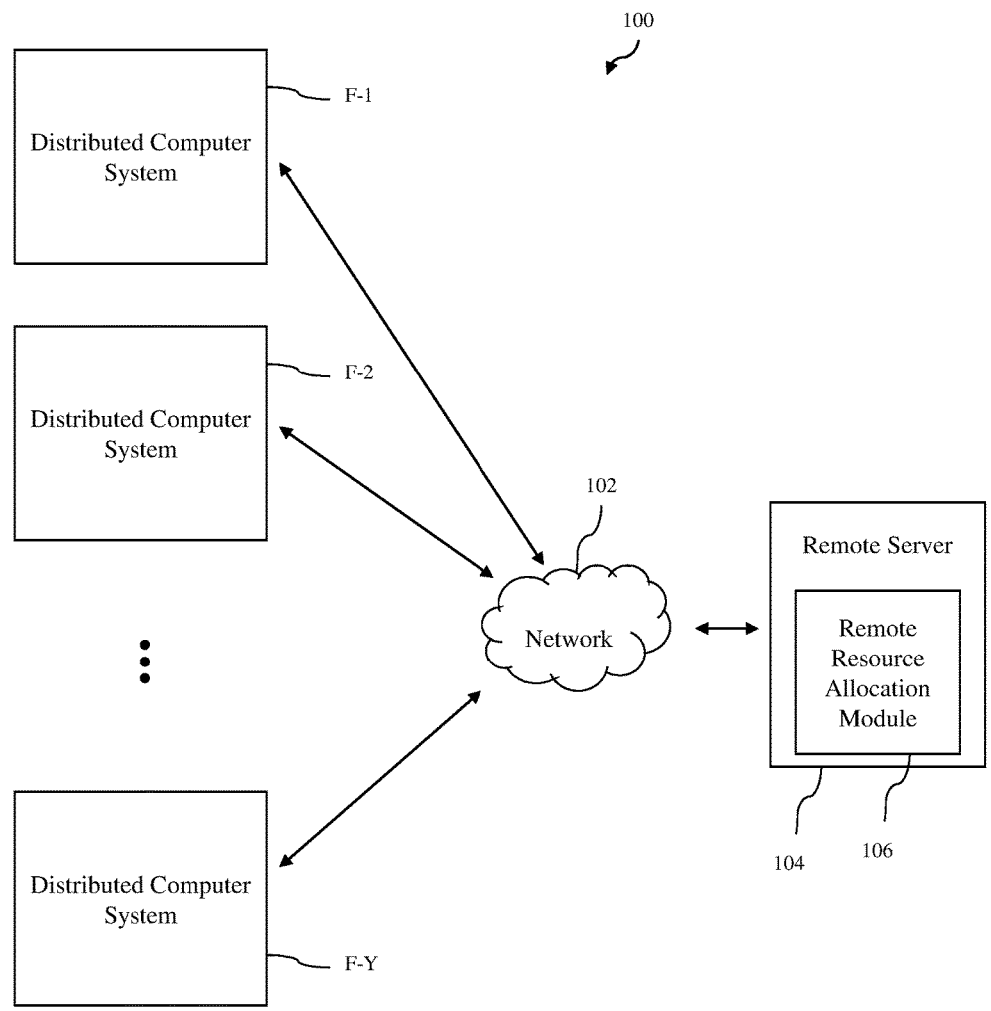
FIG. 1 is a block diagram of a computer network system in accordance with an embodiment of the invention.

Turning now to FIG. 1, a computer network system 100 in accordance with an embodiment of the invention is shown. As shown in FIG. 1, the computer network system includes a network 102, distributed computer systems F-1, F-2 . . . F-Y and a remote server 104 with a remote resource allocation module 106. The number of distributed computer systems included in the computer network system can be from few distributed computer systems to hundreds of distributed computer systems or more. The distributed computer systems and the remote server are connected to the network. Thus, the distributed computer systems are able to communicate with the remote server via the network.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

Figure 2:
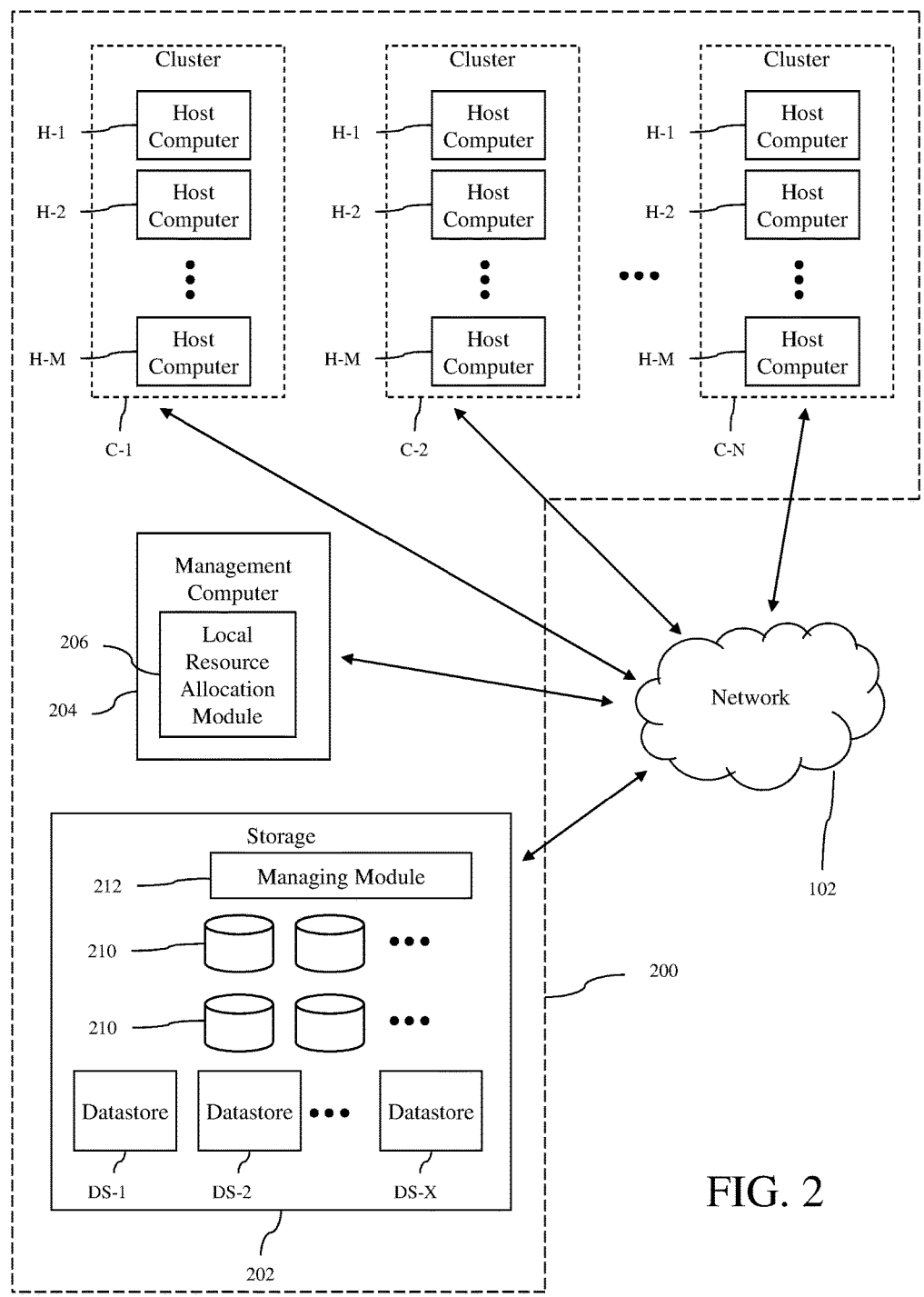
FIG. 2 is a block diagram of a distributed computer system in accordance with an embodiment of the invention.

The distributed computer systems F-1, F-2 . . . F-Y are facilities with a collection of computers and storage devices. At least some of the distributed computer systems may be data centers, and thus, may include components and systems commonly found in data centers, such as backup power supplies and environmental control systems. Each of these distributed computer systems may be owned and operated by a different entity, e.g., a company. Turning now to FIG. 2, a representative distributed computer system 200 in accordance with an embodiment of the invention is shown. As shown in FIG. 2, the distributed computer system 200 includes clusters C-1, C-2 . . . C-N of host computers, storage 202 and a management computer 204 with a local resource allocation module 206. The exact number of host computer clusters included in the distributed computer system can be any number of clusters from few clusters to tens of clusters or more. The host computers of the different clusters, the storage and the management computer are connected to the network. Thus, each of the host computers in the clusters and the management computer are able to access the storage via the network and may share the resources provided by the storage. Consequently, any process running on any of the host computers and the management computer may also access the storage via the network. Although not illustrated, the host computers of the different clusters, the storage and the management computer may be directly connected to each other.

In the illustrated embodiment, each of the clusters C-1, C-2 . . . C-N includes a number of host computers H-1, H-2 . . . H-M. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers of a cluster are located within the same server rack.

Figure 3:
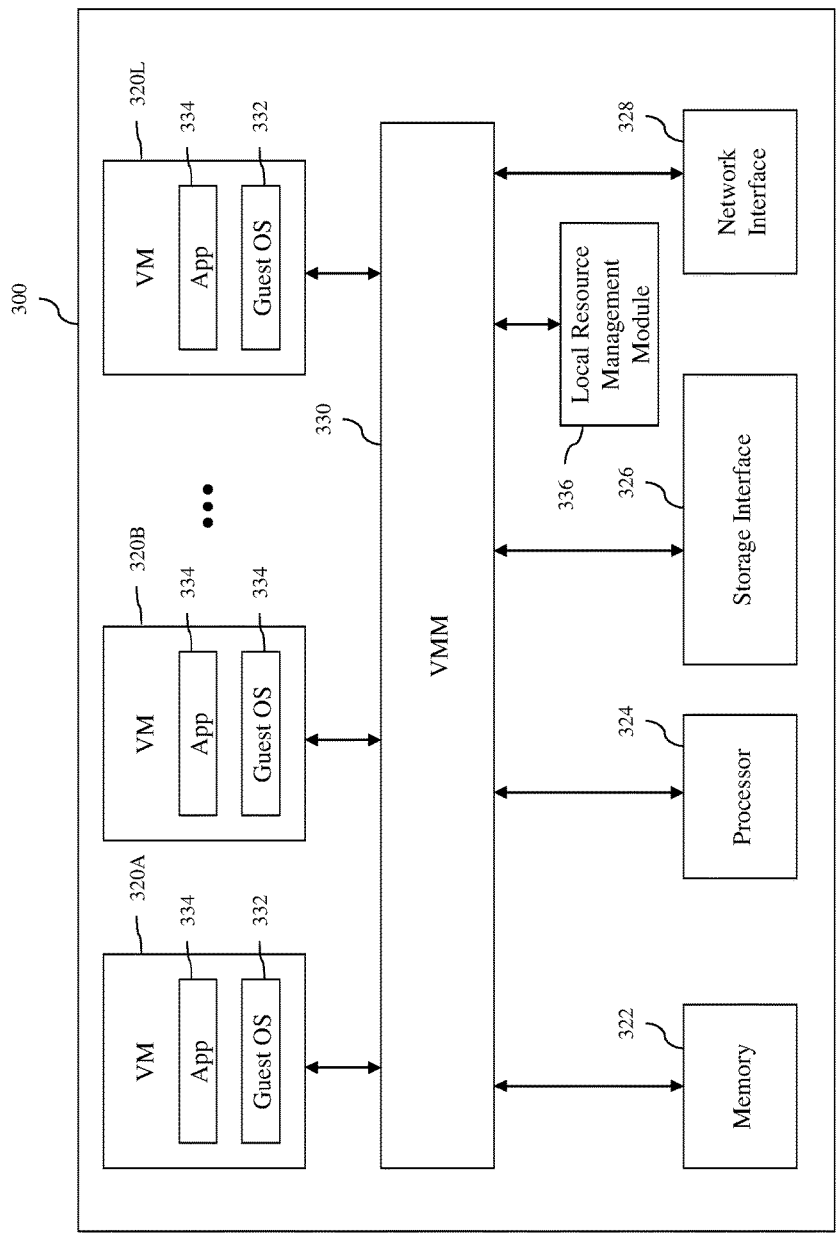
FIG. 3 is a block diagram of a host computer in accordance with an embodiment of the invention.

Turning now to FIG. 3, components of a host computer 300 that is representative of the host computers H-1, H-2 . . . H-M in the clusters C-1, C-2 . . . C-N in accordance with an embodiment of the invention are shown. In FIG. 3, the physical connections between the various components of the host computer are not illustrated. In the illustrated embodiment, the host computer is configured to support a number of clients 320A, 320B . . . 320L, which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 322, one or more processors 324, a storage interface 326, and a network interface 328. The system memory 322, which may be random access memory (RAM), is the primary memory of the host computer. The processor 324 can be any type of a processor, such as a central processing unit (CPU) commonly found in a server. The storage interface 326 is an interface that allows that host computer to communicate with the storage 202. As an example, the storage interface may be a host bus adapter or a network file system interface.

The network interface 328 is an interface that allows the host computer to communicate with other devices connected to the network 102. As an example, the network interface may be a network adapter.

In the illustrated embodiment, the VMs 320A, 320B . . . 320L run on top of a virtual machine monitor 330, which is a software interface layer that enables sharing of the hardware resources of the host computer 300 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system 332 and one or more guest applications 334. The guest operating system is a master control program of the respective VM and, among other things, the guest operating system forms a software platform on top of which the guest applications run.

Similar to any other computer system connected to the network 102, the VMs 320A, 320B . . . 320L are able to communicate with other computer systems connected to the network using the network interface 328 of the host computer 300. In addition, the VMs are able to access the storage 202 using the storage interface 326 of the host computer.

The host computer 300 also includes a local resource management module 336 that operates as part of a resource management system for a distributed computer system that includes the host computer, such as a distributed resource scheduler system, to manage resources consumed by the VMs 320A, 320B . . . 320L. Although the local resource management module is illustrated in FIG. 3 as being separate from the virtual machine monitor 330, the local resource management module may be implemented as part of the virtual machine monitor. In some embodiments, the local resource management module is implemented as software programs running on the host computer. However, in other embodiments, the local resource management module may be implemented using any combination of software and hardware.

Turning back to FIG. 2, the storage 202 is used to store data for the host computers H-1, H-2 . . . H-M of the clusters C-1, C-2 . . . C-N, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 210, which can be any type of storage devices, such as solid-state devices (SSDs), hard disks or a combination of the two. The storage devices may operate as components of a network-attached storage (NAS) and/or a storage area network (SAN). The storage includes a storage managing module 212, which manages the operation of the storage. In an embodiment, the storage managing module is a computer program executing on one or more computer systems (not shown) of the storage. The storage supports multiple datastores DS-1, DS-2 . . . DS-X, which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. For virtual machines, the datastores may be used to store virtual storage, e.g., virtual disks, used by each of the virtual machines, as well as other files needed to support the virtual machines. One or more datastores may be associated with one or more host computers. Thus, each host computer is associated with at least one datastore. Some of the datastores may be grouped into one or more clusters of datastores, which are commonly referred to as storage pods.

The management computer 204 operates to monitor and manage the host computers H-1, H-2 . . . H-M of the clusters C-1, C-2 . . . C-N and/or the storage 202 of the distributed computer system 200. The management computer may be configured to monitor the current configurations of the host computers and the clients running on the host computers, for example, virtual machines (VMs). The monitored configurations may include hardware configuration of each of the host computers, such as CPU type and memory size, and/or software configurations of each of the host computers, such as operating system (OS) type and installed applications or software programs. The monitored configurations may also include clustering information, i.e., which host computers are included in which clusters. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource settings, such as limit, reservation, entitlement and share values for various resources, e.g., CPU, memory, network bandwidth and storage, which are consumed by the clients.

The management computer 204 may also be configured to monitor the current configuration of the storage 20, including the physical storage devices 210 and the datastores DS-1, DS-2 . . . DS-X of the storage. The monitored storage configuration may include storage device configuration, which may include the number of storage devices in the storage, the device type of the storage devices, such as solid-state devices (SSDs) and hard disks, and storage capacity of each of the storage devices. The monitored storage configuration may also include datastore configuration, such as storage capacity of each of the datastores and connections and associations between the datastores and the host computers H-1, H-2 . . . H-M and/or the clients running on the host computers.

The management computer 204 may also be configured to monitor the current usage of resources by the clients, the host computers H-1, H-2 . . . H-M and the clusters C-1, C-2 . . . C-N of host computers. Thus, the management computer may monitor CPU processing usage, memory usage, network usage and storage usage of the clients. The management computer may also be configured to store the usage of resources by the clients, the host computers and the clusters of host computers to maintain historical resource usage information. The historical resource usage information can then be used to develop various resource usage statistics for the individual clients, the individual host computers and the individual clusters of host computers.

The management computer 204 may also be configured to perform various operations to manage the clients, the host computers H-1, H-2 ... H-M, the clusters C-1, C-2 ... C-N of host computers and the storage 202. As an example, the management computer may be configured to initially place new clients onto one or more of the host computers in particular clusters and move existing clients to different host computers and/or different clusters. As another example, the management computer may be configured to power down particular clients and/or host computers to conserve power. The management computer may also be configured to implement resource allocation recommendations made by the local resource allocation module 206, as explained below. In order to perform these various operations, the management computer may maintain requirements and preferences for the clients with respect to the host computers and the datastores. These requirements and preferences may include affinity or anti-affinity rules for some of the clients, which may be mandatory or preferential. For example, these affinity or anti-affinity rules may include rules that specify which clients should run on the same host computer or be kept on separate host computers. As another example, these affinity or anti-affinity rules may include rules that specify which host computers are acceptable to clients and which host computers are not. The management computer may be configured or programmed to perform other operations to manage the distributed computer system 200. In an implementation, the management computer is a VMware vCenter™ server with at least some of the features available for such server.

The local resource allocation module 206 facilitates a resource allocation analysis of the distributed computer system 200 to make resource allocation recommendations on the distributed computer system 200, including any initial client placement and client relocation recommendations, using a current snapshot of the distributed computer system. The local resource allocation module may also provide various metrics related to resource allocation.

As used herein a snapshot of a distributed computer system contains at least configuration and resource usage information of the distributed computer system at a particular moment in time. The snapshot may include the current configurations of host computers and clients running on the host computers in the distributed computer system. These configurations of the host computer and the clients may include hardware and software configurations of each host computer, clustering information, client hosting information and client information, which were described above with respect to the management computer. The snapshot may also include the current configuration of storage in the distributed computer system, including the configurations of storage devices and datastores of the storage. In addition, the snapshot may also include requirements and preferences of components in the distributed computer system. The snapshot may also include resource usage information for various components of the distributed computer system, including historical resource usage information regarding the distributed computer system. Lastly, the snapshot may also include resource allocation statistics, such as how often a client has been moved to different host computers or how often a client has consumed the entire resource allotted to that client.

Figure 4:
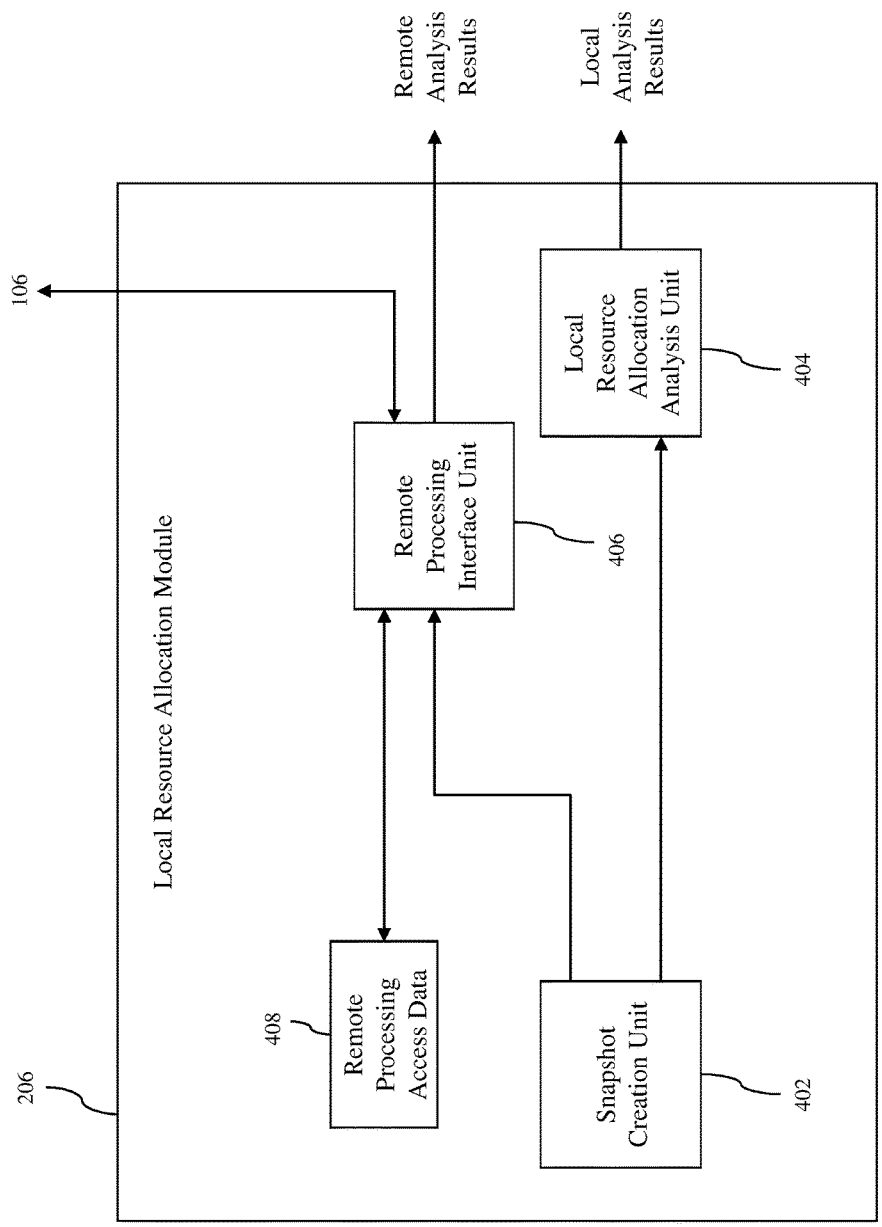
FIG. 4 is a block diagram of a local resource allocation module included in a management computer of the distributed computer system shown in FIG. 2 in accordance with an embodiment of the invention.

Turning now to FIG. 4, a block diagram of components of the local resource allocation module 206 in the management computer 204 in accordance with an embodiment of the invention is shown. As illustrated in FIG. 4, the local resource allocation module 206 includes a snapshot creation unit 402, a local resource allocation analysis unit 404 and a remote processing interface unit 406. These components of the local resource allocation module can be implemented as software, hardware or a combination of software and hardware. In other embodiments, the local resource allocation module may include other components found in conventional resource allocation modules. In a particular implementation, the local resource allocation module is a distributed resource scheduler (DRS) installed in a VMware vCenter™ server that is executed by one or more processor of the server. However, in other embodiments, the local resource allocation module may be installed in any other computer system.

The snapshot creation unit 402 operates to create a snapshot of the distributed computer system 200 using the information obtained by the local resource allocation module 206. The snapshot creation unit interfaces with other components of the management computer 204 to obtain the information needed to generate the snapshot. In an embodiment, the snapshot is a memory object, which is produced by dumping one or more memories of the management computer. The size of the snapshot can vary, but in a particular implementation, the size of the snapshot is not larger than twenty (20) Megabytes. In one mode of operation, the generated snapshot is transmitted to the local resource allocation analysis unit 404 for processing. In another mode of operation, the generated snapshot or a clone of the generated snapshot is transmitted to the remote processing interface unit 406 so that the snapshot or the snapshot clone can be processed by the remote resource allocation module 106 in the remote server 104. In still another mode of operation, the generated snapshot is transmitted to the local resource allocation analysis unit for processing and a clone of the generated snapshot is transmitted to the remote processing interface unit 406 so that the snapshot or the snapshot clone can be processed by the remote resource allocation module. As used herein, a clone of a snapshot is a copy of the snapshot.

The local resource allocation analysis unit 404 operates to process the received snapshot using at least one resource allocation analysis algorithm. Resource allocation analysis algorithms that operate on snapshots of distributed computer systems are well known, and thus, are not described herein in detail. A resource allocation analysis algorithm processes the information contained in a snapshot of a distributed computer system, such as current utilizations of resources by various components in the distributed computer system, and provides one or more recommendations to optimize resource allocation in the distributed computer system. In addition to the recommendations, the local resource allocation analysis unit may also present various metrics related to resource allocation. The local analysis results of the resource allocation analysis executed by the resource local allocation analysis unit may include a recommendation to maintain the current configurations and resource allocations for the distributed computer system 200, i.e., a recommendation to make no changes to the current configurations and resource allocations of the distributed computer system 200. Alternatively, the results of the resource allocation analysis may include a recommendation to move one or more clients from their current host computers to other host computers in the distributed computer system 200 and/or a recommendation to power down one or more clients or host computers in the distributed computer system 200 to conserve power. The results of the resource allocation analysis may also include a recommendation to change the resource entitlement for one or more clients or host computers in the distributed computer system 200 based at least on the current usage of a particular resource, as defined in the received snapshot. The recommendations contained in the local analysis results may be automatically executed by the management computer 204 if enabled to do so. Alternatively, the recommendations may be presented to a user in any format, for example, on a computer monitor, so that the user can decide to follow the recommendations, ignore the recommendations or take some other action in response to the recommendations. The management computer may be programmed or set so that certain types of recommendations are automatically executed.

The results of the resource allocation analysis executed by the local resource allocation analysis unit 404 may further include metrics related to resource allocation in the distributed computer system 200. For example, these metrics may include (a) CPU utilization with respect to percentage overcommitted per host computer or per cluster, (b) CPU ready time per client or per host computer (aggregate), (c) memory utilization with respect to percentage overcommitted per host computer or per cluster, (d) memory access latency per client or per host computer, (e) balance metric per cluster, (f) average and peak numbers of clients per host computer, (g) power consumed per host computer or per cluster (aggregate or average), (h) storage latency per host computer or per datastore, (i) storage queue depth per host computer, (j) percentage of time storage is enabled, (k) space usage per virtual disk, per datastore or per storage pod, (l) space usage with respect to percentage thin provisioned, (m) latency per datastore or per storage pod, (n) throughput per datastore or per storage pod, (o) host-datastore connectivity percentage, (p) input/output load balancing (enabled or not), (q) average and peak numbers of virtual disks per datastore, (r) number of network ports used or free per client or per host computer, and (s) chargeback with respect to current charges. For a hypothetical operating mode, these metrics can be used by the user to see how the hypothetical distributed computer system, which was virtually created using the user-modified snapshot, would fare with respect to resource allocation.

The remote processing interface unit 406 operates to interface with the remote resource allocation module 106 in the remote server 104 so that remote resource allocation analysis can be performed on the snapshot captured by the snapshot creation unit 402 or a clone of the captured snapshot. The remote processing interface unit 406 uses remote processing access data 408 to request access to the remote resource allocation module. The remote processing access data may be stored in the storage 202 or any computer storage accessible by the local resource allocation module 206. The remote processing access data contains authorization information that authorizes the local resource allocation module to access the remote resource allocation module. The information contained in the remote processing access data may include security information that identifies the local resource allocation module, such as an identification string and a password. The information contained in the remote processing access data may also contain subscription agreement information for using the service provided by the remote resource allocation module. The subscription agreement information may define any time period, e.g., day, week or month, during which the local resource allocation module is authorized to use the service provided by the remote resource allocation module. Alternatively, the subscription agreement information may define the cost for using the service provided by the remote resource allocation module based on snapshots or the processing time. The number of times the local resource allocation module uses the service of the remote resource allocation module or the total processing time of the remote resource allocation module to execute the requested services may be used to invoice the owner/operator of the distributed computer system 200.

Once access to the remote resource allocation module 106 is authorized, the remote processing interface unit 406 transmits the snapshot captured by the snapshot creation unit 402 or a clone of the captured snapshot to the remote resource allocation module so that a resource allocation analysis can be performed on the snapshot or snapshot clone. The results of the resource allocation analysis produced by the remote resource allocation module may be similar to the results produced by the local resource allocation analysis unit 404. Thus, the results of the resource allocation analysis produced by the remote resource allocation module may include one or more recommendation regarding resource allocation and various metrics related to resource allocation. The results of the resource allocation analysis produced by the remote resource allocation module are received by the remote processing interface unit and then outputted from the local resource allocation module 206. The recommendations contained in the remote analysis results may be automatically executed by the management computer 204 if enabled to do so. Alternatively, the recommendations in the remote analysis results may be presented to a user in any format, for example, on a computer monitor, so that the user can decide to follow the recommendations, ignore the recommendations or take some other action in response to the recommendations. The management computer may be programmed or set so that certain types of recommendations in the remote analysis results are automatically executed. In some implementations, the remote analysis results and the local analysis results can be presented to a user for comparison.

In some embodiments, the local resource allocation module 206 may not include the local resource allocation analysis unit 404. In these embodiments, resource allocation analyses for the distributed computer system 200 are not performed by the local resource allocation module, but outsourced to the remote resource allocation module 106.

Figure 5:
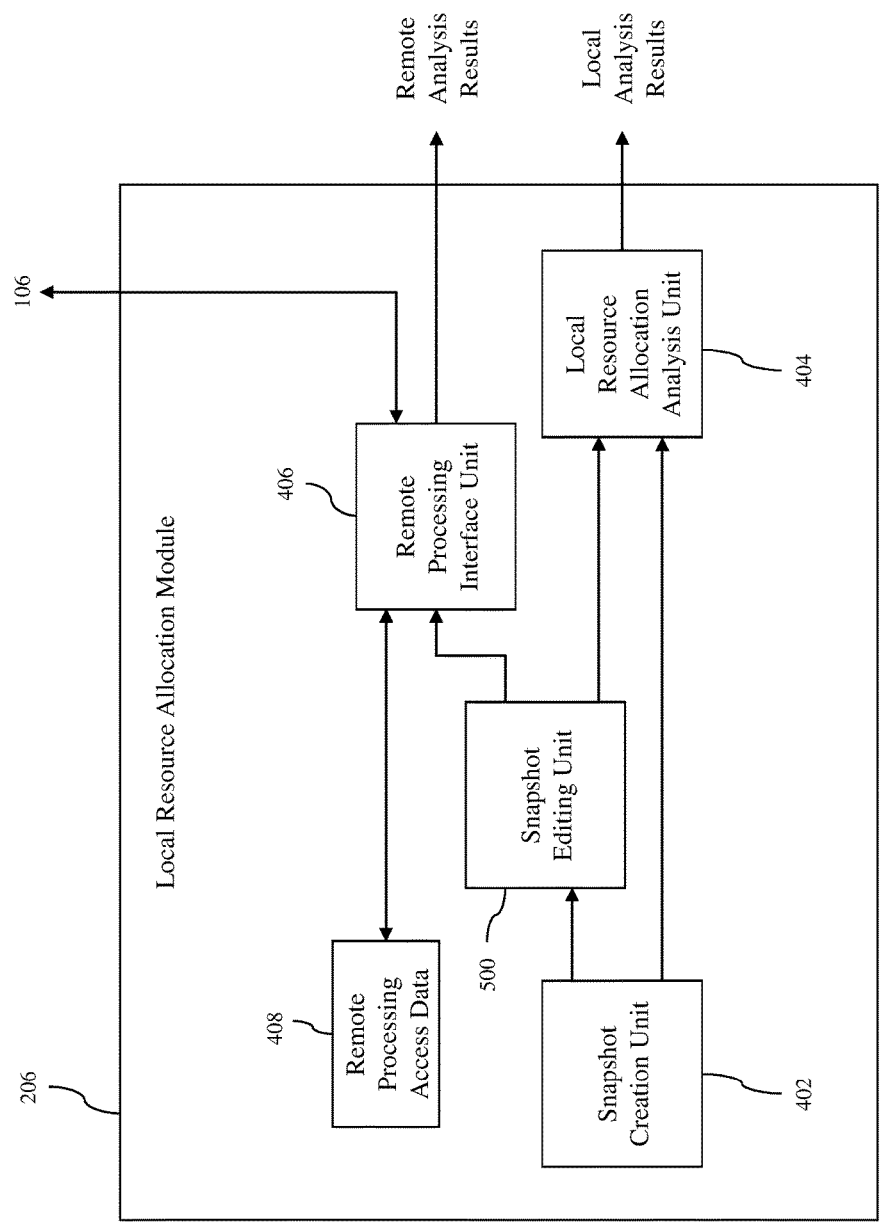
FIG. 5 is a block diagram of the local resource allocation module in accordance with another embodiment of the invention

Turning now to FIG. 5, a block diagram of components of the local resource allocation module 206 in the management computer 204 in accordance with another embodiment of the invention is shown. In this embodiment, the local resource allocation module 206 further includes a snapshot editing unit 500, in addition to the snapshot creation unit 402, the local resource allocation analysis unit 404 and the remote processing interface unit 406. These components of the local resource allocation module 206 can be implemented as software, hardware or a combination of software and hardware. In other embodiments, the local resource allocation module may include other components found in conventional resource allocation modules. In a particular implementation, the local resource allocation module is a distributed resource scheduler (DRS) installed in a VMware vCenter™ server that is executed by one or more processor of the server. However, in other embodiments, the local resource allocation module may be installed in any other computer system.

The snapshot editing unit 500 operates to allow the user to edit the original snapshot produced by the snapshot creating unit or a clone of the snapshot to produce a user-modified snapshot so that resource allocation analysis can be performed locally by the local resource allocation analysis unit 404 and/or remotely by the remote resource allocation analysis unit 504 of the remote resource allocation module 106 using the user-modified snapshot rather than the original snapshot. The user-modified snapshot can be viewed as a snapshot of an imaginary or hypothetical distributed computer system, which is similar to the distributed computer system 200 but has been virtually changed with respect to some aspect of the distributed computer system by the user. The snapshot can be edited with respect to the configuration of the clients, the host computers and/or the storage. For example, the snapshot can be edited so that a particular host computer has fewer or additional clients, e.g., VMs. As another example, the snapshot can be edited so that additional host computers are added to the distributed computer system or one or more host computers are removed from the distributed computer system. As another example, the snapshot can be edited so that additional storage devices are available in the storage 202 or fewer storage devices are available in the storage. The snapshot can be edited with respect to resource allocation requirements of the clients. For example, the snapshot can be edited so that resource limit, reservation and/or share values for one or more clients are changed. The snapshot can be edited with respect to requirements and preferences, e.g., affinity rules, for the clients. For example, the snapshot can be edited so that all the affinity rules for the clients are removed.

In an embodiment, the snapshot editing unit 500 provides a user interface, which allows the user to edit, e.g., add, delete and/or change, any aspect of a snapshot or a snapshot clone. The user interface may be a graphical user interface or any user interface that allows a user to edit or modify any content of the snapshot. In some implantations, the snapshot editing unit may allow a user to create a user-modified snapshot from scratch rather than modifying an existing snapshot. In some implementations, the snapshot editing unit operates using queries to produce user-modified snapshots. In these implementations, a user would enter a query about a specific modification to the current distributed computer facility 200 using the user interface provided by the snapshot editing unit. In response to the query, the snapshot editing unit would modify the snapshot of the distributed computer system accordingly. The modified snapshot can then be transmitted to the local resource allocation analysis unit 404 or to the remote resource allocation module 106 for processing. As an example, the query entered by the user may be "If I upgrade the inventory to add two hosts of type 1, remove one host of type 2 and add 10 new VMs, what will the new cost be?" For this query, the snapshot editing unit would modify the snapshot of the current distributed computer system to reflect these changes. The modified snapshot can then be transmitted to the local resource allocation analysis unit or to the remote resource allocation module, which would process the user-modified snapshot and produce the answer in terms of one or more relevant metrics, e.g., metric for current charges. The following is a list of additional query examples. This is not an exhaustive list.

(1) "If I upgrade these hosts in my clusters, what will my new inventory look like? What will the new balance number be? What will my new IOPS be with respect to storage?"
(2) "If I remove this affinity rule, what will be the new health of my clients/hosts/cluster?"
(3) Which are the 4 least loaded hosts that I can put into maintenance mode to upgrade them to the new build?"
(4) "Why can you not reach my target balance?"
(5) "If I make these changes to my inventory, what will the new ready time numbers look like? What will balance number look like?"
(6) "If I added a clone of host4 to, remove host3 from and added 10 clones on vm24 to my cluster, what will the new inventory look like? How many migrations will be scheduled?"
(7) "If I break this VM-VM affinity rule, what will my new average VMs-per-host number be?"
(8) "If I enable power management mode on this host, these hosts or on all hosts in the cluster, what will my new power consumption numbers be?"
(9) "If I enable power management mode in the cluster and provide a cost/watt number, what will my electricity bill be reduced by?"
(10) "If I connect these hosts to this datastore, what will my new connectivity percentage be? Will input/output load balancing become enable in my storage pod?"
(11) "If I had two clones of datastore1 in my storage pod, what will the new inventory look like? How many migrations will be scheduled?"
(12) "If I enable Host Based Replication (HBR) on these hosts in my cluster, what will be the result of the resource allocation analysis?"
(13) "If I enabled (or disabled) Site Recovery Manager (SRM) on these datastores in my storage pod, what will be the result of the resource allocation analysis?"
(14) "If I enable Enhanced VMotion Compatibility (EVC), what will be the result of the resource allocation analysis with respect to load balancing?"

Turning back to FIG. 1, in the illustrated embodiment, the remote resource allocation module 106 is located in the remote server 104, which can be any type of computer with one or more processors, memory and other components commonly found in a computer system. The remote server is physically located outside of the distributed computer systems F-1, F-2 . . . F-Y, and thus, are not part of any of the distributed computer systems. In other embodiments, the remote resource allocation module may be located in another computer or distributed among multiple computers, which are located outside of the distributed computer systems. Components of the remote resource allocation module in accordance with an embodiment of the invention are illustrated in FIG. 6.

Figure 6:
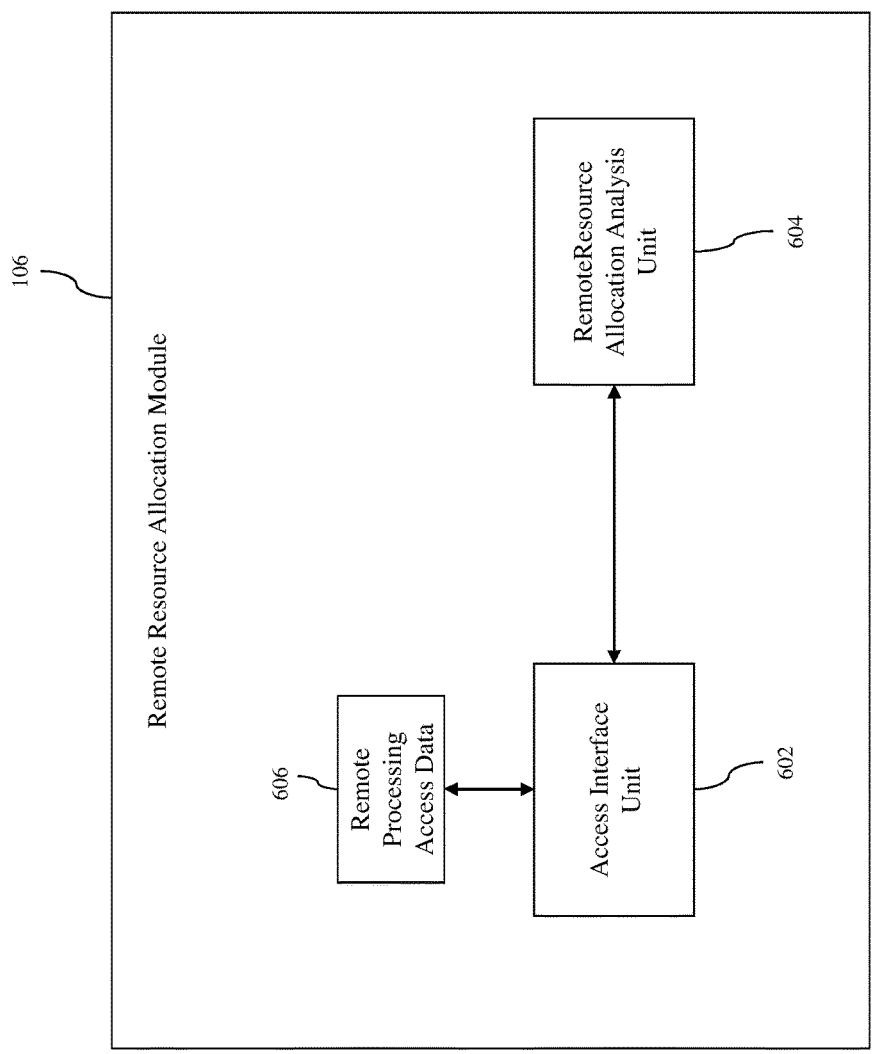
FIG. 6 is a block diagram of a remote resource allocation module included in a remote server in accordance with an embodiment of the invention.

As shown in FIG. 6, the remote resource allocation module 106 includes an access interface unit 602 and a remote resource allocation analysis unit 604. The access interface unit operates to interface with the local resource allocation modules in the different distributed computer systems F-1, F-2 . . . F-Y. In particular, the access interface unit communicates with the remote processing interface units in the local resource allocation modules. The access interface unit uses access data 606 to allow or deny access to the remote resource allocation module. The access data may be stored in any storage accessible by the remote resource allocation module. The access data contains information that indicates whether a local resource allocation module of a particular distributed computer system is authorized to access the remote resource allocation module. The information contained in the access data may include security information that identifies the authorized local resource allocation modules, i.e., local resource allocation modules that have access to the remote resource allocation module. The information contained in the access data may also contain subscription agreement information for each of the different local resource allocation modules to use the service provided by the remote resource allocation module. The subscription agreement information may define any time period, e.g., day, week or month, during which a particular local resource allocation module is authorized to use the service provided by the remote resource allocation module. Alternatively, the subscription agreement information may define the cost for using the service provided by the remote resource allocation module based on snapshots or the processing time for a particular local resource allocation module. The access data may also maintain information on the number of times each local resource allocation module uses the service of the remote resource allocation module or the total processing time of the remote resource allocation module to execute requested services for each local allocation module. Such information may be used to invoice the owners/operators of the different distributed computer systems that have used the service provided by the remote resource allocation module.

If access to the remote resource allocation module 106 is authorized, the access interface unit 602 transmits a snapshot of a distributed computer system received from the local resource allocation module accessing the remote resource allocation module to the remote resource allocation analysis unit 604 so that a resource allocation analysis can be performed on the received snapshot. The received snapshot may be an actual snapshot of a distributed computer system. Alternatively, the received snapshot may be a user-modified snapshot, which may be a snapshot created from scratch. The remote resource allocation analysis unit will process the received snapshot in the same manner regardless of whether the received snapshot is an actual snapshot or a user-modified snapshot. This is because the remote resource allocation analysis unit cannot distinguish between an actual snapshot and a user-modified snapshot. Thus, the remote resource allocation analysis unit will process a received snapshot of a distributed computer system regardless of whether the distributed computer system represented by the received snapshot is real or imaginary. This is the case for the local resource allocation analysis unit 404 of the local resource allocation module 206 as well.

The remote resource allocation analysis unit 604 operates to process the received snapshot using at least one resource allocation analysis algorithm to generate one or more recommendations regarding resource allocations for the distributed computer system, as defined by the received snapshot. In addition to the recommendations, the remote resource allocation analysis unit may also present various metrics related to resource allocation. These recommendations and metrics of the remote resource allocation analysis results may be similar to the recommendations and metrics of the local resource allocation analysis results, as described above. The resource allocation analysis algorithm used by the remote resource allocation analysis unit may be the same resource allocation analysis algorithm used by the local resource allocation module accessing the remote resource allocation module 106 or a different resource allocation analysis algorithm. The results of the resource allocation analysis performed by the remote resource allocation analysis unit are then transmitted to the accessing local resource allocation module via the access interface unit 602 and the remote processing interface unit of the accessing local resource allocation module.

The use of the remote resource allocation module 106 for performing resource allocation analyses provides many advantages. For example, a local resource allocation module installed in a management computer in a distributed computer system can be made smaller by removing the resource allocation analysis unit from the local resource allocation module. In addition, resource allocation analyses on very large distributed computer systems, i.e., with large inventories, can be performed since the remote resource allocation module can be supported by one or more powerful computer systems. Furthermore, the use of the remote resource allocation module allows a distributed computer system to run alternate/experimental resource allocation analyses in lieu of (or in addition to) the local resource allocation analyses. The use of the remote resource allocation module also allows a distributed computer system to run hypothetical scenarios for the distributed computer system with respect to configurations of clients, host computers, clusters of host computers and storage, as well as settings for various components of the distributed computer system, without significantly impacting the performance of the management computer in the distributed computer system. The use of the remote resource allocation module may also allow a third party that owns or operates the remote source allocation module to collect a repository of snapshot files from customer inventories that represent normal or steady-state behavior.

Although the remote resource allocation module 106 and the local resource allocation module 206 have been described herein with respect to any resource of the distributed computer system 200, in other embodiments, these resource allocation modules may be configured to perform resource allocation analyses with respect to specific resources of the distributed computer system. For example, the remote and local resource allocation modules may be configured to perform resource allocation analyses with respect to resources only provided by the host computers of the distributed computer system. As another example, the remote and local resource allocation modules may be configured to perform resource allocation analyses with respect to resources only provided by the storage 202 of the distributed computer system. In other embodiments, there may be remote and local resource allocation modules to perform resource allocation analyses with respect to resources only provided by the host computers of the distributed computer system and additional remote and local resource allocation modules to perform resource allocation analyses with respect to resources only provided by the storage of the distributed computer system.

Figure 7:
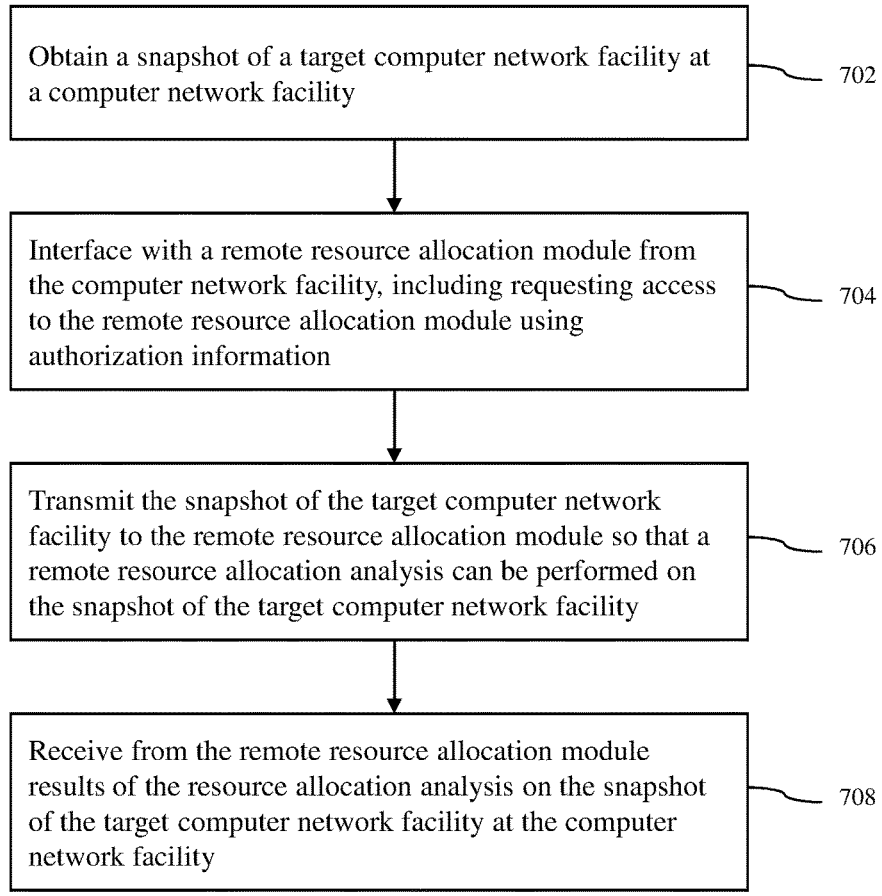
FIG. 7 is a flow diagram of a method for performing remote resource allocation analyses on distributed computer systems in accordance with an embodiment of the invention.

A method for performing remote resource allocation analyses on distributed computer systems in accordance with an embodiment of the invention is described with reference to a flow diagram of FIG. 7. At block 702, a snapshot of a target distributed computer system is obtained at a distributed computer system. The snapshot includes configurations and resource usage information of at least some components of the target distributed computer system. At block 704, a remote resource allocation is interfaced from the distributed computer system. In addition, access to the remote resource allocation module is requested using authorization information. The remote resource allocation module is located outside of the distributed computer system. At block 706, the snapshot of the target distributed computer system is transmitted to the remote resource allocation module so that a remote resource allocation analysis can be performed on the snapshot of the target distributed computer system. At block 708, results of the resource allocation analysis on the snapshot of the target distributed computer system from the remote resource allocation module are received at the distributed computer system.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing remote resource allocation analyses on a plurality of distributed computer systems, the method comprising:
   interfacing with the distributed computer systems at a remote resource allocation module that is located outside of the distributed computer systems, including receiving requests for access to the remote resource allocation module using authorization information;
   receiving a plurality of computer system snapshots from the distributed computer systems at the remote resource allocation module;
   performing remote resource allocation analyses on the computer system snapshots, each of the computer system snapshots including configurations and resource usage information of at least some computer system components; and
   transmitting results of the resource allocation analyses on the computer system snapshots from the remote resource allocation module to the distributed computer systems.

2. The method of claim 1, further comprising charging the distributed computer systems for accessing the remote resource allocation module in accordance with a subscription plan based on per usage, per time period or per processing time unit.

3. The method of claim 1, wherein performing the remote resource allocation analyses includes generating one or more recommendations regarding resource allocations for the distributed computer systems as defined by the computer system snapshots.

4. The method of claim 3, wherein performing the remote resource allocation analyses further includes presenting a plurality of metrics related to resource allocations.

5. The method of claim 1, further comprising performing local resource allocation analyses on at least some of the computer system snapshots at the distributed computer systems.

6. The method of claim 5, wherein performing the remote resource allocation analyses includes executing a first resource allocation analysis algorithm on the computer system snapshots, the first resource allocation analysis algorithm being different than a second resource allocation analysis algorithm used for the local resource allocation analyses.

7. The method of claim 1, wherein each of the computer system snapshots includes requirements of clients running on host computers in the distributed computer systems.

8. The method of claim 7, wherein the clients running on the host computers in the distributed computer systems include virtual machines.

9. A non-transitory computer-readable storage medium containing program instructions for performing remote resource allocation analyses on a plurality of distributed computer systems, wherein execution of the program instructions by one or more processors of a computer system causes the one or more processors to perform steps comprising:
   interfacing with the distributed computer systems at a remote resource allocation module that is located outside of the distributed computer systems, including receiving requests for access to the remote resource allocation module using authorization information;
   receiving a plurality of computer system snapshots from the distributed computer systems at the remote resource allocation module;
   performing remote resource allocation analyses on the computer system snapshots, each of the computer system snapshots including configurations and resource usage information of at least some computer system components; and
   transmitting results of the resource allocation analyses on the computer system snapshots from the remote resource allocation module to the distributed computer systems.

10. The non-transitory computer-readable storage medium of claim 9, wherein the steps further comprise charging the distributed computer systems for accessing the remote resource allocation module in accordance with a subscription plan based on per usage, per time period or per processing time unit.

11. The non-transitory computer-readable storage medium of claim 9, wherein performing the remote resource allocation analyses includes generating one or more recommendations regarding resource allocations for the distributed computer systems as defined by the computer system snapshots.

12. The non-transitory computer-readable storage medium of claim 11, wherein performing the remote resource allocation analyses further includes presenting a plurality of metrics related to resource allocations.

13. The non-transitory computer-readable storage medium of claim 9, wherein the steps further comprise performing local resource allocation analyses on at least some of the computer system snapshots at the distributed computer systems.

14. The non-transitory computer-readable storage medium of claim 9, wherein performing the remote resource allocation analyses includes executing a first resource allocation analysis algorithm on the computer system snapshots, the first resource allocation analysis algorithm being different than a second resource allocation analysis algorithm used for the local resource allocation analyses.

15. The non-transitory computer-readable storage medium of claim 9, wherein each of the computer system snapshots includes requirements of clients running on host computers in the distributed computer systems.

16. The non-transitory computer-readable storage medium of claim 15, wherein the clients running on the host computers in the distributed computer systems include virtual machines.

17. A system for performing remote resource allocation analyses on a plurality of distributed computer systems, the system comprising:

memory; and
a processor configured to:
  interface with the distributed computer systems to receive requests for access to the remote resource allocation module using authorization information;
  receive a plurality of computer system snapshots from the distributed computer systems;
  perform remote resource allocation analyses on the computer system snapshots, each of the computer system snapshots including configurations and resource usage information of at least some computer system components; and
  transmit results of the resource allocation analyses on the computer system snapshots to the distributed computer systems.

18. The system of claim 17, wherein the processor is further configured to charge the distributed computer systems for accessing the remote resource allocation module in accordance with a subscription plan based on per usage, per time period or per processing time unit.

19. The system of claim 17, wherein the processor is further configured to generate one or more recommendations regarding resource allocations for the distributed computer systems as defined by the computer system snapshots.

20. The system of claim 19, wherein the processor is further configured to present a plurality of metrics related to resource allocations.

* * * * *